United States Patent [19]

Neuville

[11] 3,852,722
[45] Dec. 3, 1974

[54] IMPROVED STATIC REMOTE-CONTROL RELAY SELECTION SYSTEM
[75] Inventor: Claude Neuville, Paris, France
[73] Assignee: Compteurs Schlumberger, Montrouge, France
[22] Filed: June 28, 1973
[21] Appl. No.: 374,452

[30] Foreign Application Priority Data
June 30, 1972 France .............................. 72.23730

[52] U.S. Cl. .............. 340/172.5, 340/167, 340/168, 317/134, 317/137, 317/140
[51] Int. Cl. ..... G06f 3/04, H01h 47/00, H04q 1/52
[58] Field of Search..... 340/172.5, 310, 163, 167 R, 340/168 R; 328/71, 49; 307/247, 38, 40; 317/134, 137, 140

[56] References Cited
UNITED STATES PATENTS

| | | | |
|---|---|---|---|
| 3,264,397 | 8/1966 | Glickman......................... | 340/172.5 |
| 3,359,551 | 12/1967 | Dennison......................... | 340/310 |
| 3,414,884 | 12/1968 | Jensen ............................ | 340/172.5 |
| 3,470,539 | 9/1969 | Proud, Jr. et al. ................ | 340/172.5 |
| 3,522,588 | 8/1970 | Clarke, Jr. et al. ................. | 340/147 |
| 3,594,648 | 7/1971 | Rappaport.......................... | 328/48 |
| 3,634,826 | 1/1972 | Biedermann..................... | 340/167 R |
| 3,651,469 | 3/1972 | Keese............................. | 340/168 R |
| 3,656,064 | 4/1972 | Giles.............................. | 329/104 |
| 3,719,890 | 3/1973 | Borciani et al. ..................... | 325/55 |
| 3,744,029 | 7/1973 | Nyman............................ | 340/172.5 |

FOREIGN PATENTS OR APPLICATIONS
2,101,287    3/1972    France

Primary Examiner—Gareth D. Shaw
Assistant Examiner—James D. Thomas
Attorney, Agent, or Firm—William R. Sherman

[57] ABSTRACT

Disclosed is a static remote-control relay which can be controlled by a pulse train, comprising:

a bistable memory, a controllable pulse generator, the control input of which is connected to a first output of the said bistable memory, a controllable counter whose reset control input is connected to the first output of the bistable memory, the count input being connected to a second output of the controllable pulse generator, the output of the said counter corresponding to an order higher than that of the number of pulses from the finite set being connected to the second input of the said first bistable memory, a coincidence gate with at least two inputs receiving, on one of its inputs, the pulse train, its other input being connected to the first output of the controllable pulse generator, a programmable logic the inputs of which are respectively connected to the outputs of the said counter, to the second output of the said first bistable memory and to the output of the said coincidence gate.

1 Claim, 1 Drawing Figure

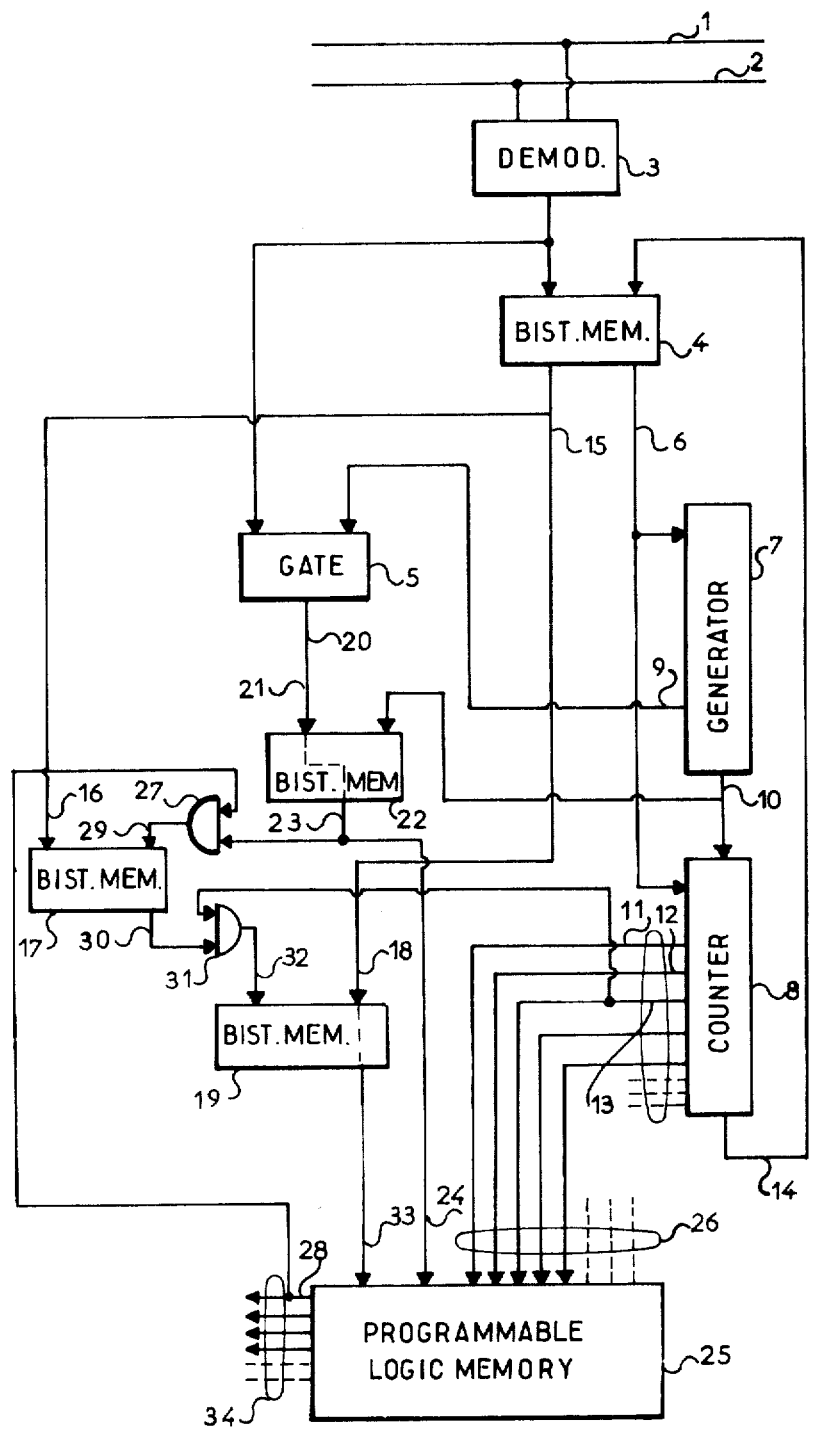

IMPROVED STATIC REMOTE-CONTROL RELAY SELECTION SYSTEM

BACKGROUND OF THE INVENTION

This invention relates to static remote-control relay and more particularly to static relays for centralized remote control applications, i.e., relays allowing the remote control of receivers from a transmission station through the use of pulse-code modulated trains superimposed on a current carried by an electric power line. The pulses of each train are coded so that they act selectively on the control of the receivers.

Before controlling the receivers, it is necessary to separate the pulses from the cycles of the electric current carried by the line, the separation being performed, for example, by filtering. Then, once these pulses are demodulated and filtered, it is necessary to selectively control the receivers in accordance with the code given to the pulse train, for example as a function of the order of the pulse in the pulse train, this order being determined with respect to a first pulse called the starting pulse.

These devices allowing the control of receivers in accordance with the control pulses sent on an electric power line are called remote-control relays.

There are known static remote-control relays of this kind and in particular a static relay comprising, from the output of a frequency selector, a first and a second coordination gate both connected by an input to the output of the frequency selector, a flip-flop with two outputs the first output of which is connected to an input of the first coordination gate, so that this gate is open during the starting pulse of the remote-control pulse train. This static relay moreover comprises a timing circuit inserted between the first gate and one of the two inputs of the flip-flop so that this flip-flop is changed over only at the end of the starting pulse, i.e., the first pulse of the remote control train. The second output of the bistable memory is connected to the second input of the second coordination gate so that this second gate is open only after the change-over of the bistable memory and when the coding pulses are applied to it. The second gate is connected by its output to an input of a set of coordination gates controlling static receivers, one of the gates of this set of coordination gates being connected to a decoding assembly containing the addresses of each of the receiver control gates. The decoding assembly includes an element for counting the cycles of the alternating current carried by the line by which are transmitted the remote-control signals. This counting element is connected to the line via a coordination gate one input of which is connected to the line and the other input of which is connected to the second output of the flip-flop so that the cycles of the current carried by the line are counted only after the change-over of the flip-flop, i.e., after receiving the first signal of the train, that is to say the starting pulse.

The static relay as described above yields very good results, but it is still too complex, and consequently, costs too much and, especially, does not make it possible to meet present-day requirements in pulse-train type centralized remote-control applications.

It is an object of the present invention to overcome at least partially these drawbacks. It is a further object of the invention to provide a remote-control relay of simple design and, especially, one made up only of static components which can be designed in monolithic integrated circuit form without any difficulty.

SUMMARY OF THE INVENTION

The invention provides a static remote-control relay which can be controlled by a pulse train comprising:

a first bistable memory with at least two inputs, a first input receiving the pulse trains, a controllable pulse generator delivering, on a first output, pulses at the same frequency as those of the said finite pulse set the control input of which is connected to a first output of the said bistable memory, a coincidence gate with at least two inputs receiving, on one of its inputs, the said pulse train, its other input being connected to the first output of the said controllable pulse generator, a controllable counter whose reset control input is connected to the first output of the said bistable memory, the count input being connected to the output of the said controllable pulse generator, the said counter capable of delivering count pulses respectively on its outputs, the number of count pulses being higher than the number of pulses from the said finite set, the output of the said counter corresponding to an order higher than that of the number of pulses from the finite set being connected to the second input of the said first bistable memory, a programmable logic the inputs of which are respectively connected to the outputs of the said counter, to the second output of the said first bistable memory, and to the output of the said coincidence gate, the outputs of the said programmable logic constituting the utilizable outputs of the said static remote-control relay.

Other features and advantages of the present invention will appear from the following description taken in connection with the appended drawing in which:

BRIEF DESCRIPTION OF THE DRAWING

The FIGURE represents the schematic diagram of a static remote-control relay according to the invention.

In a centralized remote-control system, the industrial current, having a frequency $\nu 1$ of 50 Hz for example, is carried by a line made up for example of two conductors 1 and 2. On this current having a frequency $\nu 1$ is superimposed a train of remote-control pulses. Each pulse is made up of a set of signals having a frequency $\nu 2$ different from an integral of the frequency $\nu 1$ of the line current preferably by one half of the frequency $\nu 1$. For certain applications, this frequency $\nu 2$ is chosen equal to about 175 Hz when that of the current is 50 Hz. The remote-control signals sent on the line are generally made up of a first pulse called the starting pulse followed by a finite set of pulses transmitted at a given frequency $\nu 3$, this frequency being very low, for example of the order of 0.4 Hz. The first starting pulse is separated from the first pulse of the finite set of pulses by a time differing by one multiple from the time between two pulses of the finite set of pulses. By way of example, it is common to find pulse trains made up of pulses having a duration of about one second, each pulse of the finite set being separated by a time of about 1.5 second, while the time separating the first pulse, i.e., the starting pulse, from the first pulse of the set is about 2.75 seconds.

DESCRIPTION OF ILLUSTRATIVE EMBODIMENT

The static remote-control relay illustrated in the FIGURE comprises, at its input, a selector-demodulator 3 of a known type whose two inputs terminals are connected respectively to the conductors 1 and 2 of the industrial current transmission line. The output of the selector-demodulator 3 is connected to a first input of a first bistable memory 4 and to an input of a coincidence gate 5. The first ouput 6 of the first bistable memory 4 is connected to the respective control inputs of a controllable pulse generator 7 and of a controllable counter 8. The controllable pulse generator 7 delivers, at its output 9, pulses having the same frequency as the pulses of the finite set of the train, i.e., the frequency $\nu 3$, this output 9 of the pulse generator 7 being connected to the second input of the coincidence gate 5. The count input of the counter 8 is connected to a second output 10 of the pulse generator 7, this output 10 delivering the same pulses as those delivered at the output 9, but with a determined lag with respect to those delivered at the ouput 9. The counter 8 is designed preferably so that it delivers, at its outputs 11, 12, 13 and 14, a number of pulses higher than that of the finite set of the pulse train. The output 14 of the counter 8, corresponding to the last pulse it can deliver, i.e., that of an order higher than the number of pulses of the set, is connected to the second input of the first bistable memory 4.

The second output 15 of the first bistable memory 4 is connected respectively to a first input 16 of a second bistable memory 17 and to a first input 18 of a third bistable memory 19. The output 20 of the coincidence gate 5 connected to a first input 21 of a fourth bistable memory 22 whose output 23 is connected to an input 24 of a programmable logic 25 whose operation and structure are explained below. The inputs 26 of the programmable logic 25 are connected to the outputs 11, 12, 13 ... of the controllable counter 8, the number of these inputs 26 being at least equal to the number of pulses in the finite set of the train of remote-control pulses. The output of the fourth bistable memory 22 is also connected to an input of a first AND gate 27, the second input of this gate 27 being connected to a predetermined output 28 of the programmable logic 25. The output of this first AND gate 27 is connected to the second input 29 of the second bistable memory 17. The output 30 of the bistable memory 17 is connected to one input of a second AND gate 31 the other input of which is connected to an output of the controllable counter 8, for example the output 13 corresponding to an output pulse of a determined order. The output of this AND gate 31 is connected to the second input 32 of the third bistable memory 19. The output of this bistable memory 19 is connected to an input 33 of the programmable logic 25. The output 34 of the programmable logic 25 constitute the outputs of the static remote-control relay according to the invention. These outputs can be connected to control inputs of switches controlling different kinds of receivers.

The operation of the system is as follows:

For a better understanding of the operation of the static relay according to the invention, it will be initially assumed that the device illustrated in the FIGURE does not include the bistable memory 17, the bistable memory 19, the bistable memory 22, the two AND gates 27 and 31 and that the output 20 of the coincidence gate 5 is connected directly to the input 24 of the programmable logic 25, and that the output 15 of the first bistable memory 4 is connected directly to the input 33 of the programmable logic 25, as indicated by dashed lines.

The bistable memory 4 constantly delivers at its output 6, when it is in its rest state, i.e. when the selector-demodulator does not deliver pulses at its output, a control signal which makes it possible to maintain at zero the controllable pulse generator, i.e., to prevent it from delivering at its output 9 the pulses with the frequency $\nu 3$, and to prevent the counter 8 from counting the pulses obtained at the output 10 of the generator 7. When the selector-demodulator detects a train of remote-control pulses, it delivers at its output only the remote-control pulses. The first pulse, called the starting pulse, changes over the bistable memory 4. The changing signal on its output 6 then allows the control of the pulse generator 7 which delivers at its output 9 pulses with the same frequency as that of the pulses of the finite set of the pulse train. The generator 7 delivers a second pulse at its output 9 after a time which is equal to the time separating the starting pulse from the first pulse of the set of the pulse train. Thus, at its input 9 it delivers pulses which are in phase with the pulses of the finite set of the train of remote-control pulses so that the first starting pulse which is applied both to the bistable memory 4 and to the input of the coincidence gate 5 changes over the bistable memory 4 but is stopped by the gate 5, since the controllable pulse generator has not yet delivered a reference pulse at its output 9. By contrast, when a control pulse is transmitted at the output of the selector-demodulator after the starting pulse, two pulses arrive simultaneously at the two inputs of the coincidence gate 5. Thus, the control pulse of the train is obtained at the output 20 of the gate 5, this pulse obtained at the output 20 of the gate 5 is consequently sent directly to the programmable logic 25. The pulse generator 7 also delivers at its output 10, which in this case could be the same as the output 9, pulses with the same frequency as those of the pulses of the finite set of the train. The counter 8 begins to count these pulses and delivers, each time, at its outputs 11, 12, 13, count pulses which are also in phase with the pulses of the finite set. The pulses obtained at the outputs 11, 12, 13 ... of the counter 8 are applied to the logic inputs of the programmable logic 25. When the pulse is obtained at the output of the coincidence gate 5 and if it is in phase with one of the pulses delivered by the counter 8 and if the bistable memory 4 has changed over to deliver at its output 15 a signal applied to the other input 33 of the programmable logic 25, this programmable logic 25 delivers at its output, determined by prior programming, a pulse making it possible to control the switch of a determined receiver. However, the counter continues to count and to deliver successively on its outputs pulses in phases with all the pulses of the finite set of the remote-control train which could be transmitted and it delivers at the end of its count, at its output 14, a last pulse which is applied to the second input of the bistable memory to make it come back to its initial state, thereby allowing, through the signal transmitted at its output 6, the blocking of the controllable pulse generator 7 and the resetting of the counter 8.

In centralized remote-control systems, the first pulses of the finite set, i.e., the pulses after the starting pulse, are quite often reserved for the preselection of a certain number of equipments from among those capable of receiving the remote-control transmission. Generally, the first ten pulses are reserved for this kind of control.

In this type of operation only the relays having received the preselection pulse for which they have been programmed can then perform the operation corresponding to the pulses making it possible to carry out the orders. For this operation with preselection, the device now includes, in addition to those mentioned above in describing the preceding operation, the second bistable memory 17, the third bistable memory 19 and the two AND gates 27 and 31.

In this case, it is assumed that the preselection pulse has an order number lower than the order of the pulse delivered by counter 8 at its output 13, i.e., for example, it is assumed that the preselection pulse is the fourth in the order of the pulses of the finite set and that the counter delivers at its output 13 a pulse corresponding to the eleventh pulse of the control train. In this case, it is assumed that the third bistable memory 19 delivers at its output a signal which is applied to the input 33 of the programmable logic 25 and which allows the passage or the authorization of all the other pulses. In this case, when the control pulse for this preselection is obtained at the output of the selector-demodulator 3, if it is in the time coincidence with the pulse delivered by the controllable pulse generator 7, the coincidence gate 5 delivers at its output 20 a pulse which is applied simultaneously to the input 24 of the logic 25 and to an input of the AND gate 27, the other input of the gate 27 being connected to a determined output 28 of this logic 25. Thus, if a pulse is obtained at this output 20, the gate 27 is open and delivers at its output 29, which is connected to the second input of the bistable memory 17, a signal which changes it over, so as to obtain at its output 30 a signal to block the AND gate 31. When the counter 8 delivers, at its output 13, the pulse corresponding to the eleventh pulse, as the gate 31 is blocked by the signal delivered by the bistable 17, the bistable memory 19 then remains in its initial state and delivers at its output a signal which is applied to the input 33 of the logic 25, the signal authorizing the passage of all the other control pulses obtained simultaneously at the outputs of the counter 8 and at the output of the coincidence gate 5.

On the other hand, if the relay preselection pulse is not that which had been programmed, no pulse appears at the determined output, i.e., in the chosen example, the output 28 of the programmable logic 25, whereas the gate 27 remains blocked and hence the bistable memory 17 delivers at its output 30 a signal which is applied to the gate 31, thereby allowing, when the counter delivers the pulse at this output 13, which is applied to the second input of the AND gate 31 — the opening of the AND gate 31 to allow the passage of the signal which is then applied to the input 32 of the third bistable memory 19 thereby causing the change-over of this memory and making it possible to obtain at its output a signal which is applied to the input 33 of the programmable logic 25 and prevents the control of the receivers by all the other control pulses which may be transmitted subsequently at the output of the selector demodulator.

In particular, the use of a programming matrix known as the "PROM" with junction melting or breakdown, such as MOTOROLA MCM5003AL or MCM5004AL, for example, makes it possible to solve the problem of the prior programming of equipment, at the lowest cost.

Besides the fourth bistable memory 22 permits to control pulse width at the input 24 to equal the predetermined delay between the pulses delivered at the outputs 9 and 10 of the pulse generator 7.

What is claimed is:

1. In a static remote-control relay which can be controlled by a pulse train including a starting pulse followed by a finite set of possible pulses transmitted at a given frequency, the starting pulse being separated from the first possible pulse of said finite set of possible pulses by a time differing from the time between two possible pulses of the said finite set of possible pulses, including:

means for receiving said finite possible pulse set;

a pulse generator responsive to the first starting pulse to start delivering, at an output thereof, pulses in phase with the pulses of the said finite possible pulse set;

a counter having a count input connected to said pulse generator for counting pulses generated thereby and a plurality or ordered outputs, the number of said ordered counter outputs being at least as large as the number of possible pulses from the finite set and each said counter output delivering a pulse when the pulse count stored in said counter corresponds to the order of the respective counter output; and a programmable logic circuit having a plurality of inputs respectively connected to the ordered outputs of the said counter, at least one input connected to said pulse train receiving means and a plurality of useful outputs to selectively produce control signals on said useful outputs in response to pulse coincidence on said pulse train receiving means and a predetermined one of said counter outputs, the improvement which comprises a preselection circuit responsive to preselection pulses forming a first part of said finite set of possible pulses for inhibiting said programmable logic circuit when a predetermined preselection pulse is not detected in coincidence with a predetermined count pulse delivered by said counter, said preselection circuit comprising:

a first bistable circuit coupled to an output of said programmable logic circuit for memorizing the coincidence of a preselection pulse in said first part of the first set of pulses and of a predetermined count pulse, means coupled to said first bistable circuit and to a predetermined one of said counter ordered outputs having an order higher than that corresponding to the end of said first part of the finite set of possible pulses for detecting the occurrence of a pulse at said predetermined counter output when no coincidence has been memorized by said first bistable circuit, and a second bistable circuit coupled to said detecting means for switching in response to said detected occurrence into a state inhibiting said programmable logic circuit until the end of the finite pulse set.

* * * * *